June 15, 1965 W. D. CANNON ETAL 3,189,733

TELEGRAPH SIGNAL BIAS AND DISTORTION METER

Filed May 8, 1962 10 Sheets-Sheet 1

INVENTORS
W. D. CANNON
D. J. BERTUCCIO
BY Eli Weiss
ATTORNEY

TELEGRAPH SIGNAL BIAS AND DISTORTION METER

Filed May 8, 1962 10 Sheets-Sheet 2

INVENTORS
W. D. CANNON
D. J. BERTUCCIO
BY Eli Weiss
ATTORNEY

INVENTORS
W. D. CANNON
D. J. BERTUCCIO
BY
Eli Weiss
ATTORNEY

June 15, 1965 W. D. CANNON ETAL 3,189,733

TELEGRAPH SIGNAL BIAS AND DISTORTION METER

Filed May 8, 1962 10 Sheets-Sheet 4

INVENTORS
W. D. CANNON
D. J. BERTUCCIO
BY
Eli Weiss
ATTORNEY

TELEGRAPH SIGNAL BIAS AND DISTORTION METER

Filed May 8, 1962 10 Sheets-Sheet 5

INVENTORS
W. D. CANNON
D. J. BERTUCCIO
BY
Eli Weiss
ATTORNEY

TELEGRAPH SIGNAL BIAS AND DISTORTION METER

Filed May 8, 1962 10 Sheets-Sheet 6

INVENTORS
W. D. CANNON
D. J. BERTUCCIO
BY
Eli Weiss
ATTORNEY

TELEGRAPH SIGNAL BIAS AND DISTORTION METER

Filed May 8, 1962 10 Sheets-Sheet 7

INVENTORS
W. D. CANNON
D. J. BERTUCCIO
BY
Eli Weiss
ATTORNEY

TELEGRAPH SIGNAL BIAS AND DISTORTION METER

INVENTORS
W. D. CANNON
D. J. BERTUCCIO
BY
Eli Weiss
ATTORNEY

INVENTORS
W. D. CANNON
D. J. BERTUCCIO
BY
Eli Weiss
ATTORNEY

INVENTORS
W. D. CANNON
D. J. BERTUCCIO
BY
Eli Weiss
ATTORNEY 3,189,733
Patented June 15, 1965

3,189,733

TELEGRAPH SIGNAL BIAS AND DISTORTION METER

William D. Cannon, Metuchen, N.J., and Domenick J. Bertuccio, Jamaica, N.Y., assignors to The Western Union Telegraph Company, New York, N.Y., a corporation of New York Filed May 8, 1962, Ser. No. 193,201
4 Claims. (Cl. 235—92)

This invention relates generally to a bias and distortion meter for indicating or measuring bias and distortion present in permutation code telegraph signals and more particularly to the detection and indication of bias distortion and distortion other than bias distortion present in high speed marking and spacing data signals by digital procedures.

It is an object of this invention to provide an improved bias and distortion meter which can operate accurately at high speeds.

It is another object of this invention to provide an improved bias and distortion meter which can be used for signals of all unit lengths.

It is an additional object of this invention to provide an improved bias and distortion meter which indicates simultaneously both bias distortion and distortion other than bias distortion.

It is still another object of this invention to provide a counter chain with an initial operating range and an intermediate operating range.

It is also an object of this invention to provide an improved bias and distortion meter which is reliable in operation and economical to build.

Figures 1, 11, 12:
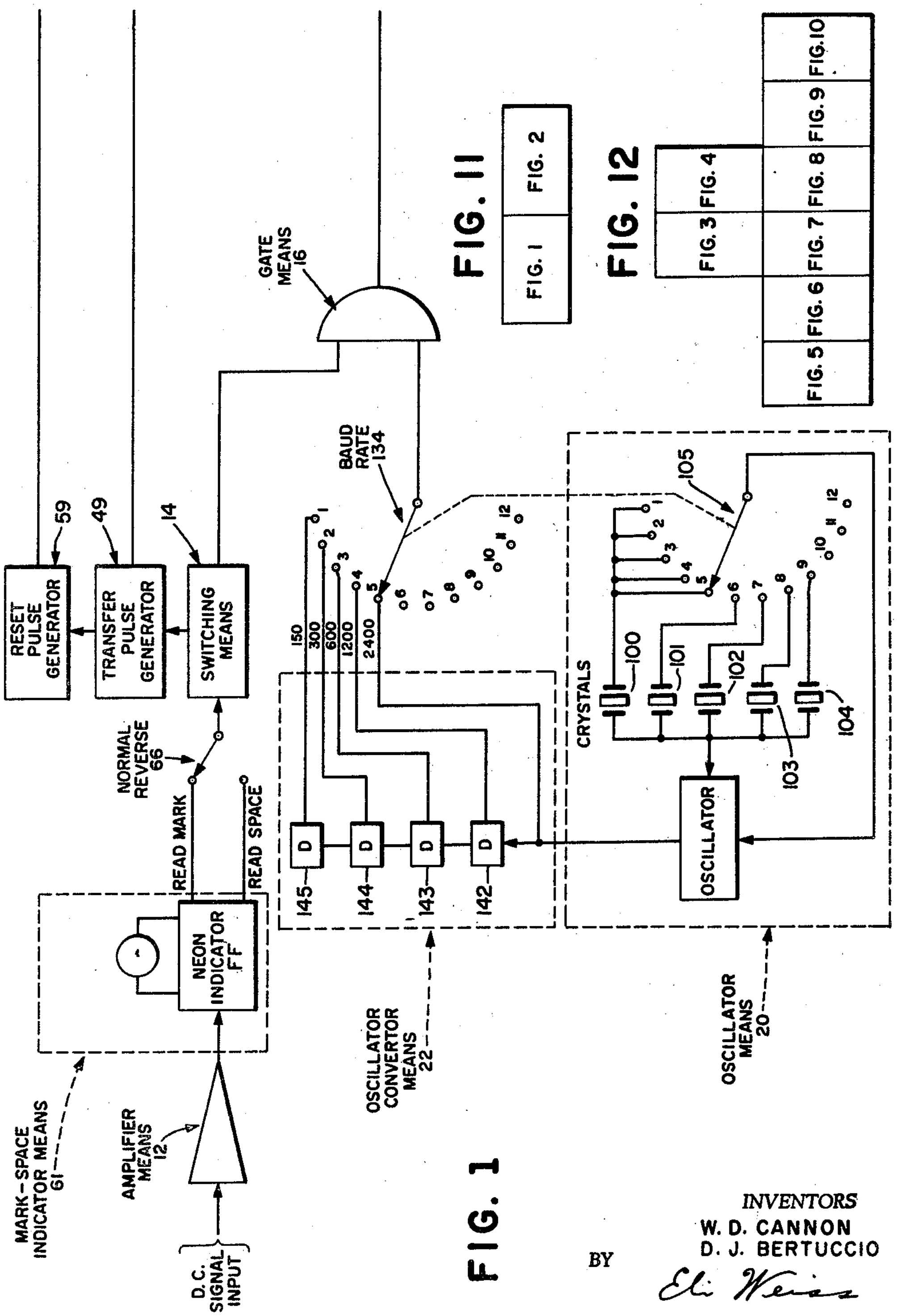
Figure 2:
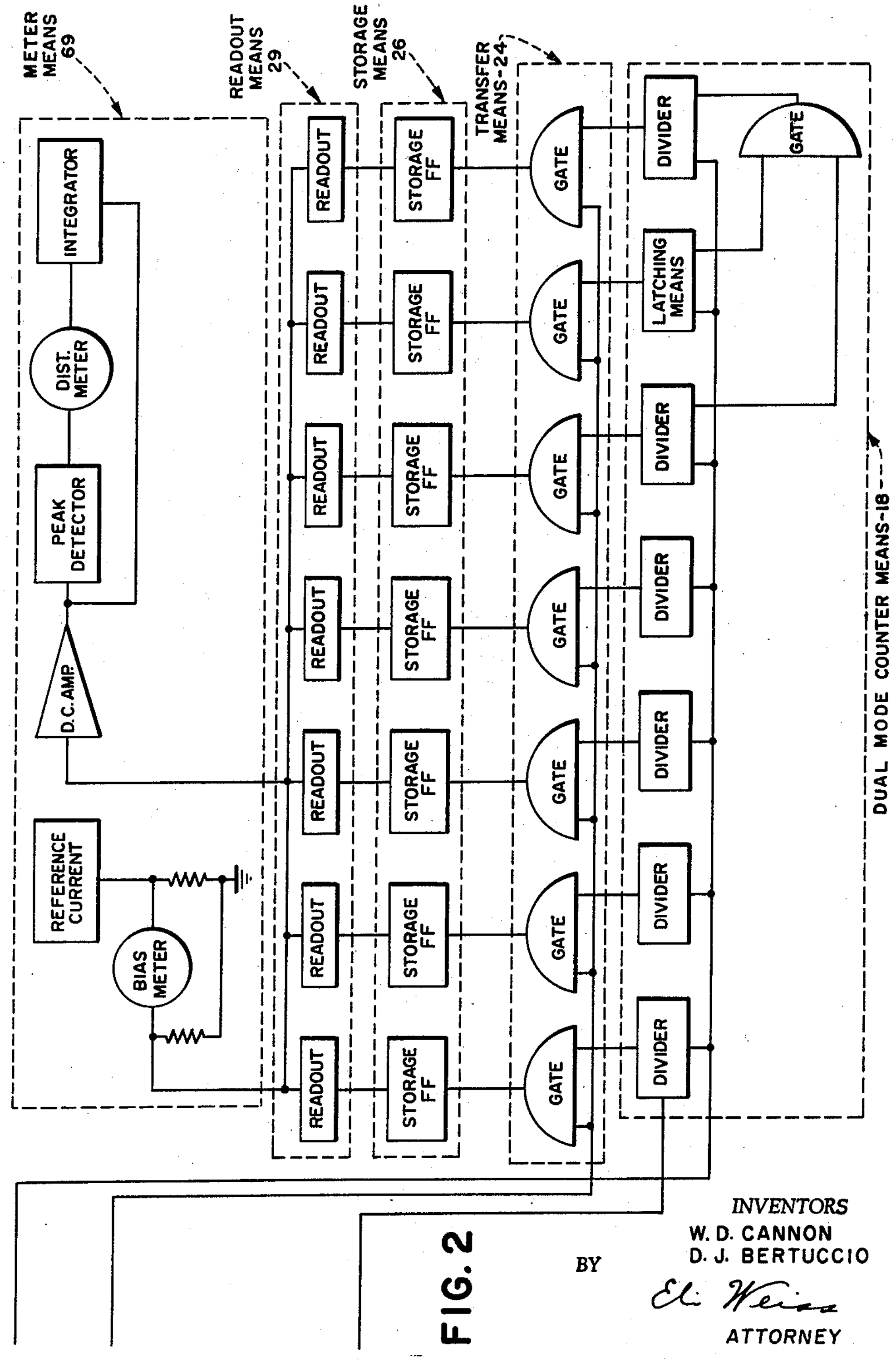
Figure 3:
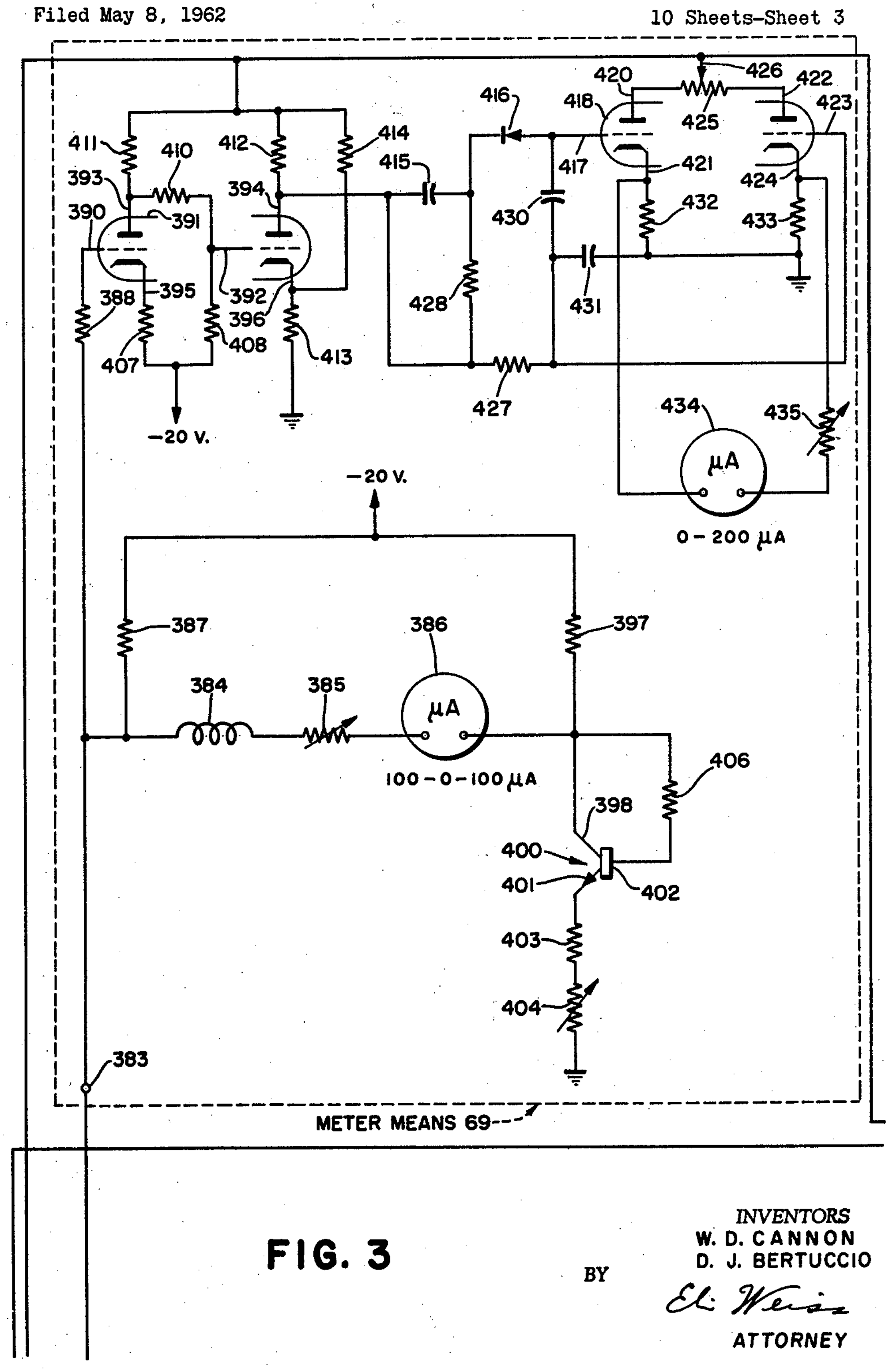
Figure 4:
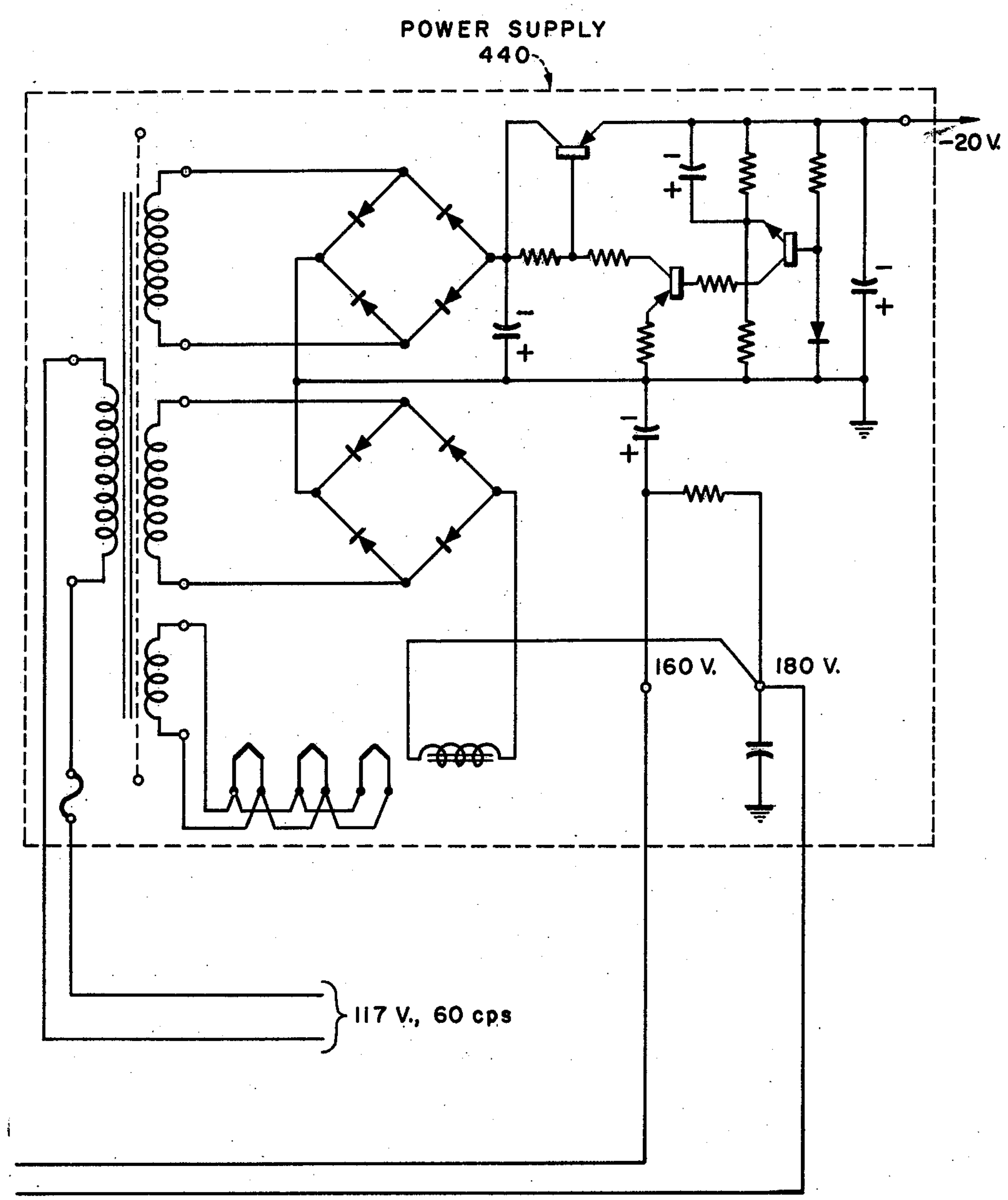
Figure 5:
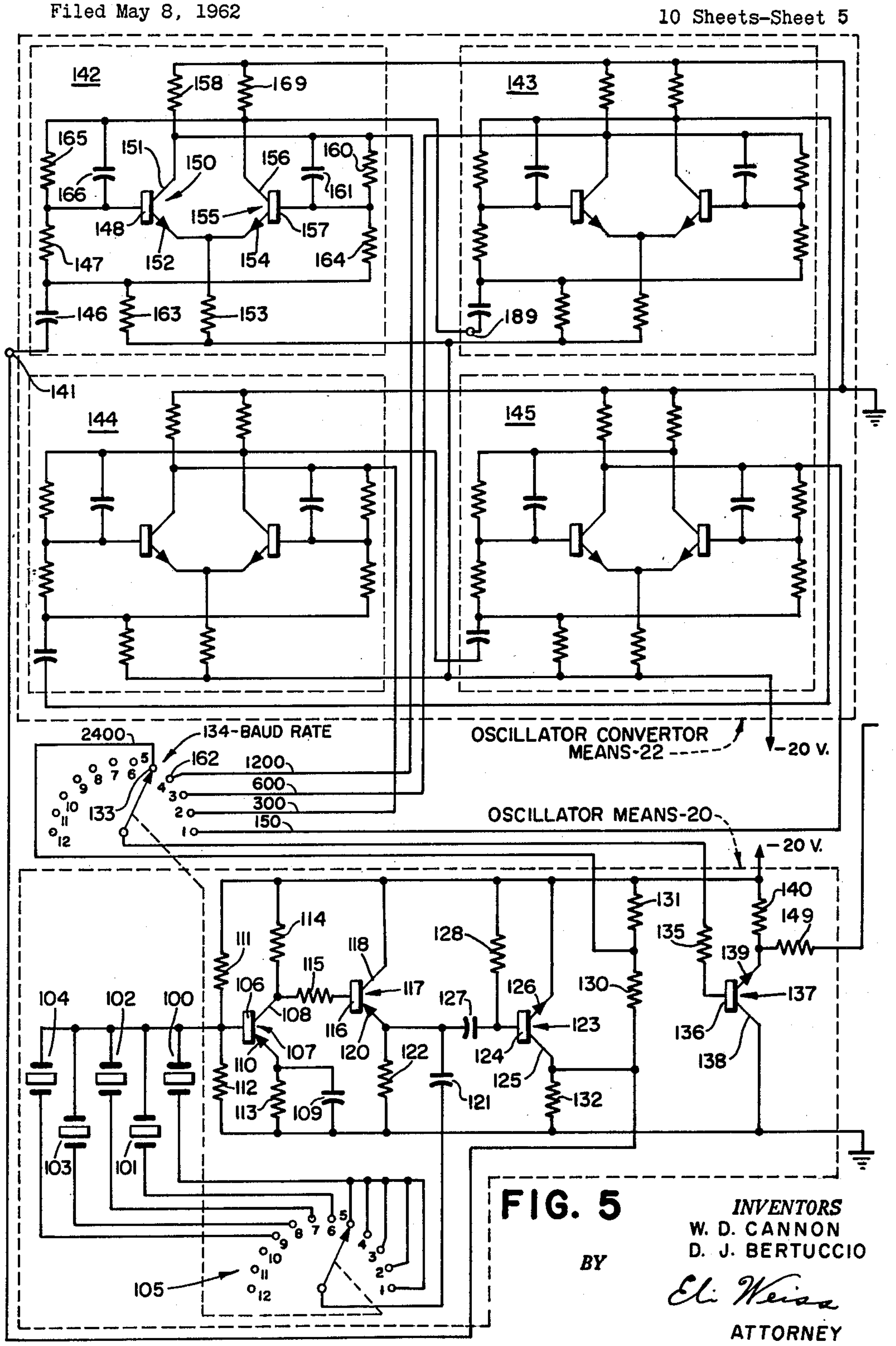
Figure 6:
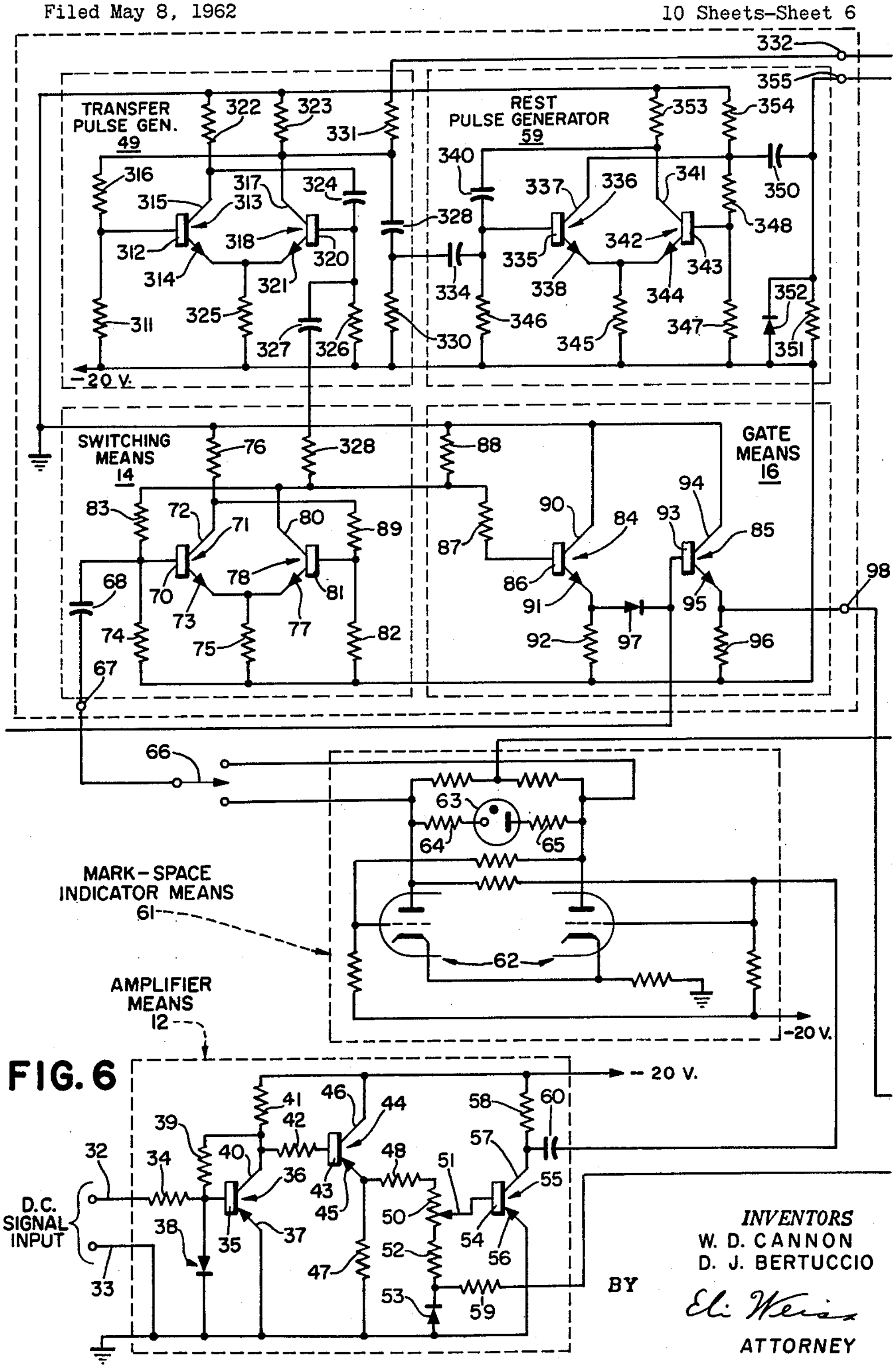
Figure 7:
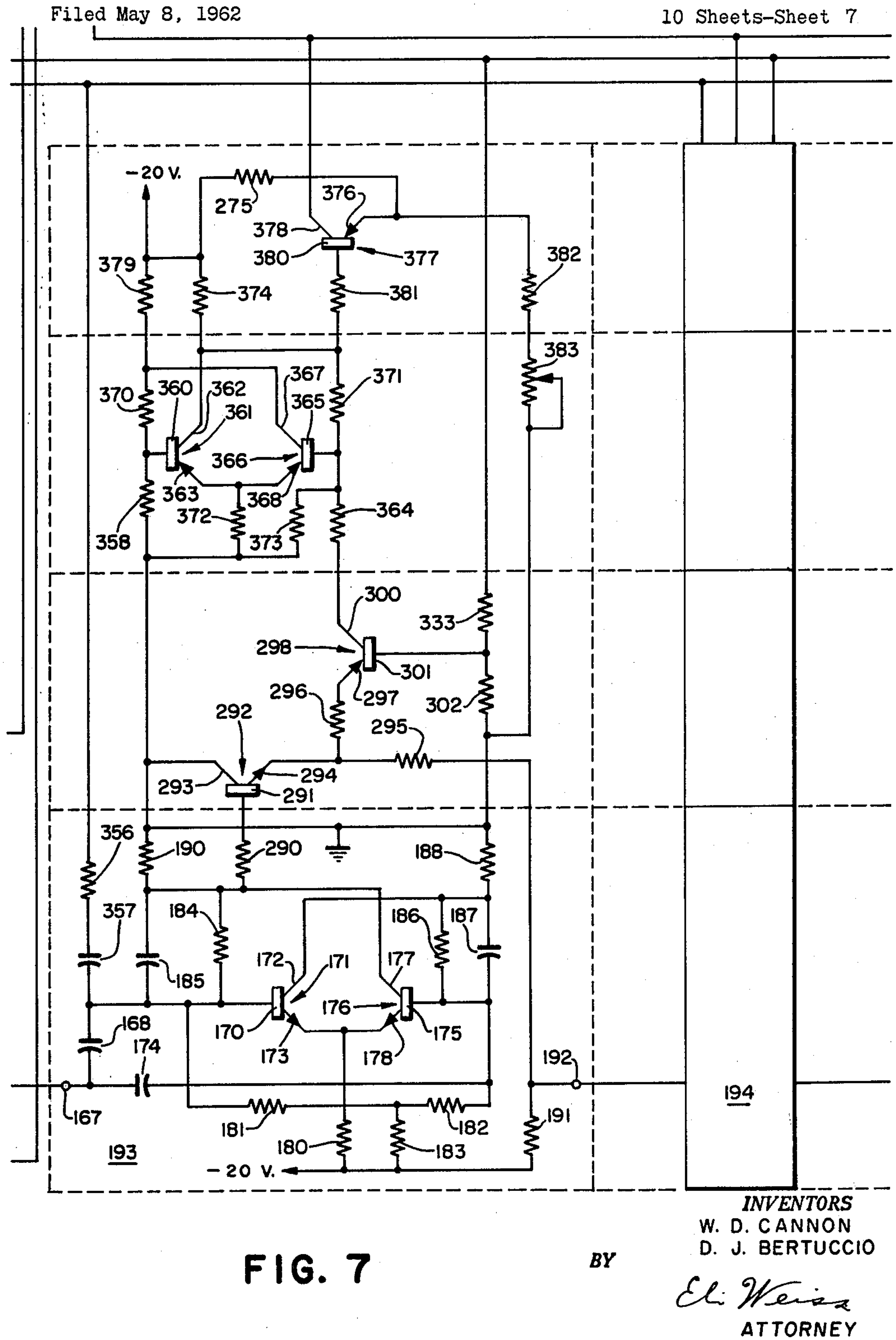
Figure 8:
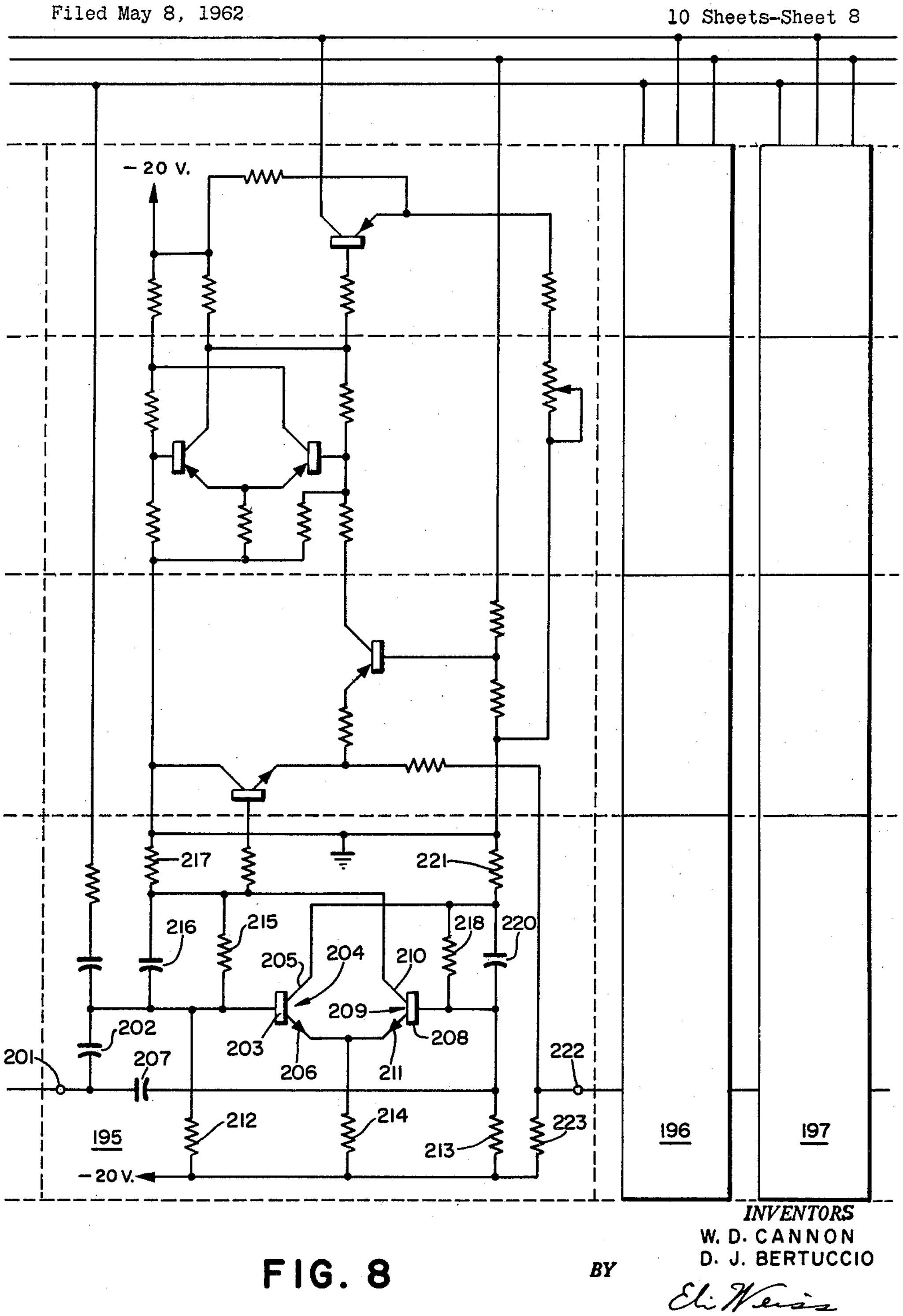
Figure 9:
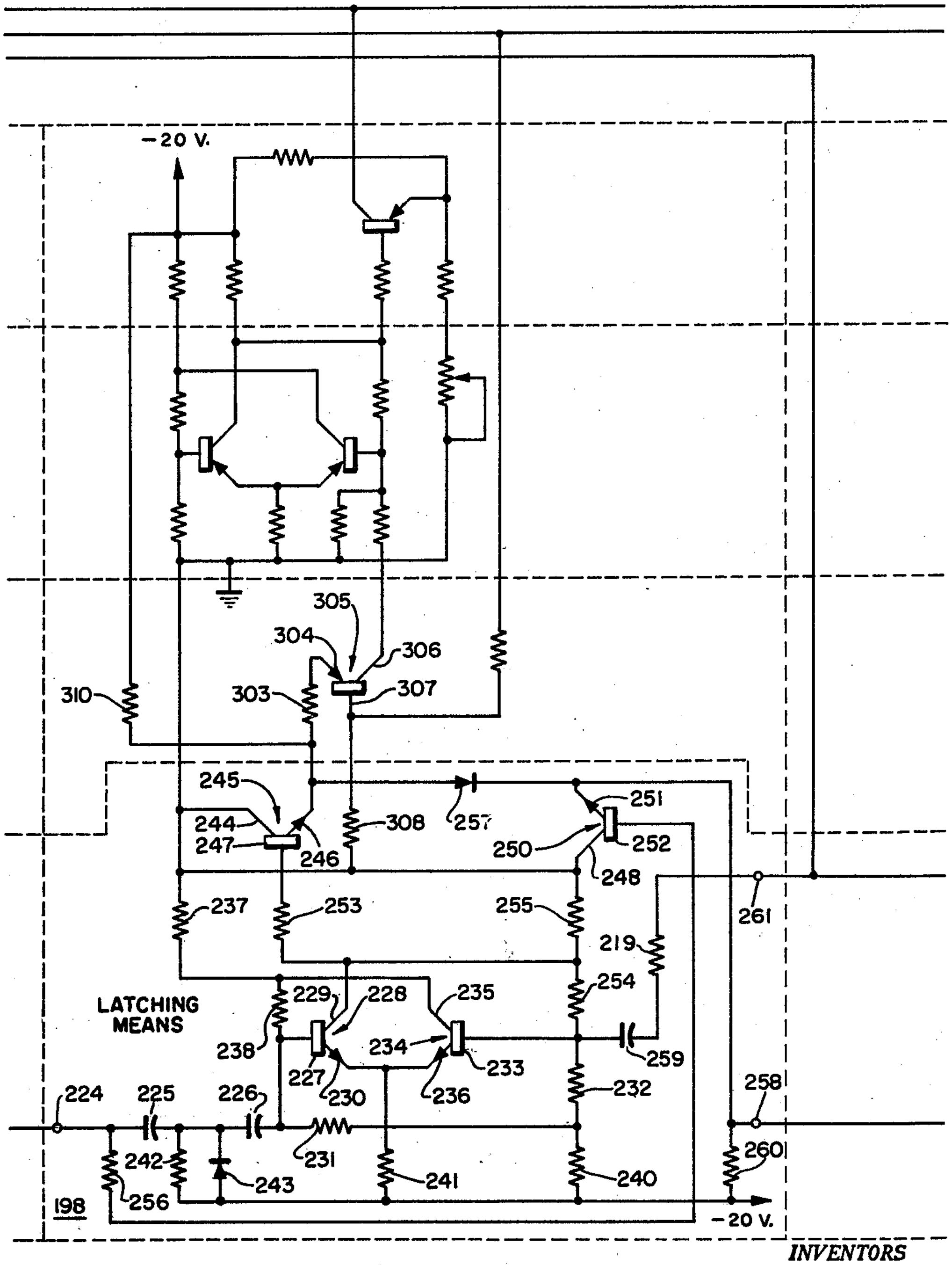
Figure 10:
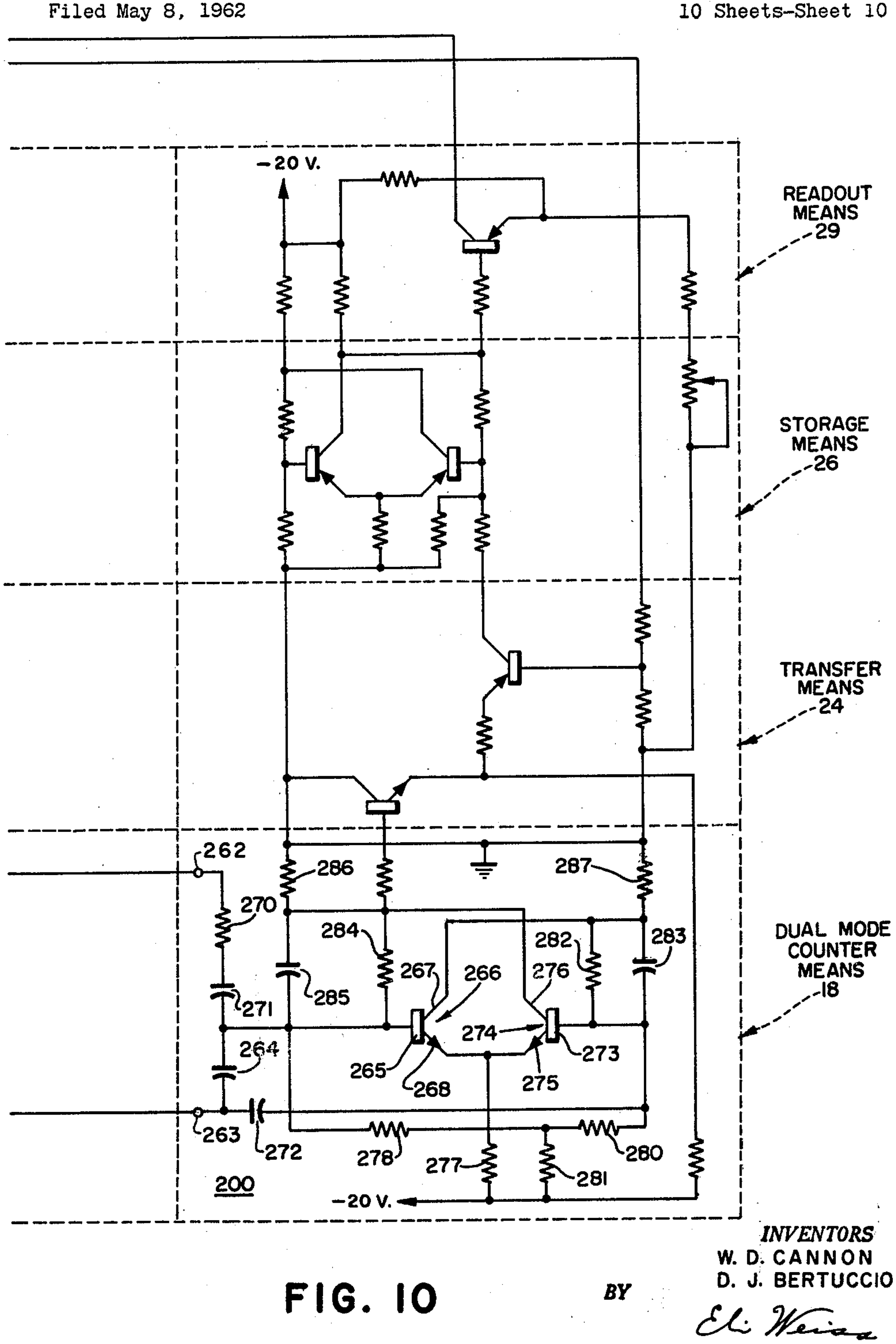

Other objects and many of the attendant advantages of this invention will be readily appreciated as the apparatus becomes better understood by reference to the following detailed description when considered in connection with the accompanying drawings wherein:

FIGS. 1 and 2 when arranged as indicated in FIG. 11 provide a block diagram of the structure of this invention; and FIGS. 3, 4, 5, 6, 7, 8, 9, and 10, when arranged as shown in FIG. 12 form a schematic diagram of the structure of this invention.

Briefly, during the occurrence of a mark or space pulse signal repetitive occurring pulse signals from an oscillator means are fed to a dual mode counter means. Initially, the dual mode counter means is conditioned to count from zero to its maximum count which, for convenience, shall be some number here designated as 1½X. If during the occurrence of the mark or space pulse signal the repetitious occurring pulse signals received are greater than 1½X, then the dual mode counter means will not be reset to zero—but will be reset to ½X and the recoding of the count is continued until the signal terminates.

Once having reached its maximum state by indicating a count of 1½X, then the dual mode counter means will never return to its zero condition. It always returns to its ½X count condition until the mark or space pulse signal terminates.

After the mark or space pulse signal terminates, the count which is stored in the dual mode counter means is transferred through a storage means to a readout means where the "count" is converted to a current magnitude. This current magnitude is fed to a bias meter means and to a distortion other than bias meter means commonly referred to as distortion meter means where the degree of distortion is displayed for visual observation.

With reference to FIGS. 1 and 2 there is illustrated a block diagram of structure in accordance with the principles of this invention.

Upon receipt of a mark to space signal transition by an amplifier means 12, a switching means 14 is conditioned to urge a gate means 16 to pass repetitive occurring pulse signals generated by an oscillator means 20 and converted to a predetermined rate of occurrence by an oscillator converter means 22 to the first stage of a dual mode counter means 18.

If single, double, triple and so on pulse lengths are to be measured then the pulse signals generated must be some multiple to very close tolerances. Thus, with a band rate of 2400, the pulse signals generated are 64 times the band rate (i.e., 64×2400) and a frequency of 156.3 kc. is required. It can be 32× or 128× (the higher figure yields greater accuracy) but it must be a multiple.

It has been determined that a frequency which provides sixty four cycles per bit length is very satisfactory. However, the frequency of sixty four cycles per bit length is not critical or necessary for the successful operation of this structure and a signal having another multiple (32 or 128)—either higher or lower than the sixty four cycle per bit can be used.

Continuing, for use with a signal which has a frequency which provides 64 pulses per bit length there is provided a dual mode counter means 18 which supports five stages to provide a count of thirty two, and a sixth and seventh auxiliary stage. When the count of thirty two is reached, at the end of the first half bit length (since 64 pulse signals now equals one bit length), the sixth stage is driven to register a count of thirty two. At the same time, the first five stages are reset to zero and again start to count. The occurrence of the second transition—that of a space to mark signal transition urges the switching means 14 to drive the gate 16 to its "off" condition and the pulse signals from the oscillator means 20 are blocked and do not reach the dual mode counter means 18.

If the second or cutoff transition occurs during the second half of the bit the count—which is less than 64—is transferred through a transfer means 24 to a storage means 26 for utilization to indicate the degree of marking bias. However, if the second or cutoff transition does not occur during the second half of the bit—then the seventh stage is driven to register a count of sixty four, the sixth stage still registers its count of thirty two, and the first five stages are reset to zero and again start to count.

If the cutoff transition occurs within the third half bit, then a count in excess of sixty four is transferred through the transfer means to the storage means for utilization to indicate the degree of spacing bias.

If the cutoff transition has not occurred within either the second or third half bits to indicate that the signal has a length of two or more bits, the seventh stage is reset to its zero state, and the first five stages are reset to zero and again start to count. However, the sixth stage continues to register its count of thirty two. This cycling procedure continues until the cutoff transition does finally occur.

The final count transferred to the storage means 26 will be related to the type and the degree of bias present. For example, if there is spacing bias present the count transferred to the storage means will be sixty four plus an amount which represents the degree of spacing bias; and if there is marking bias present the count transferred to the storage means will be sixty four minus an amount which represents the degree of marking bias. When there is an absence of bias—both spacing and marking—the count transferred to the storage means will be exactly sixty four.

With the occurrence of each space to mark transition the count present in the dual mode counter means 18 is transferred through the transfer means to the storage means where it is read by the readout means and fed to the metering means 69.

Now, with reference to FIGS. 3, 4, 5, 6, 7, 8, 9, and 10 which, when assembled as indicated in FIG. 12 illustrates structure in accordance with the principles of this invention.

*Amplifier means*

The received signal is fed to the input terminals of the amplifier means 12. The amplifier means 12 is a D.C. amplifier which has a high impedance input so that it can be connected in shunt with a signal carrying line without affecting materially the loading or normal operating conditions on the line.

The amplifier means 12 supports two input terminals 32, 33—terminal 32 being coupled through a resistor 34 to the base terminal 35 of transistor 36, and terminal 33 being coupled directly to a ground terminal. Emitter terminal 37 of transistor 36 is connected to the ground terminal and the base terminal 35 is connected to the ground terminal through a diode 38. A resistor 39 is interposed between base terminal 35 and collector terminal 40. A source of negative potential is connected through a resistor 41 to collector terminal 40.

Collector terminal 40 is connected through a resistor 42 to the base terminal 43 of a transistor 44 which supports an emitter terminal 45 and a collector terminal 46. Collector terminal 46 is coupled to the source of negative potential, and emitter terminal 45 is coupled through a resistance 47 to the ground terminal. Connected in shunt with resistor 47 is the series combination of a fixed resistor 48, a resistor 50 having a tap terminal 51, another resistor 52, and a diode 53. The tap terminal 51 of resistor 50 is connected to the base terminal 54 of a transistor 55 which supports an emitter terminal 56 and a collector terminal 57. The source of negative potential is connected through a resistor 58 to the collector terminal 57, and the emitter terminal 56 is connected to the ground terminal. The junction of the resistor 52 with the diode 53 is connected through a resistor 59 to a source of positive potential.

The signal present on the collector terminal 57 of transistor 55 is fed through a capacitor 60 to the mark-space indicator means 61.

*Mark-space indicator means*

The mark-space indicator means 61 utilizes the two halves of a 12AT7 type vacuum tube 62. In operation, a received positive going signal urges the spacing half of the tube 62 to its on state, and the occurrence of a negative going pulse signal urges the marking half of the tube 62 to its on state. A neon indicator 63 of the NE48 type is connected between the anode terminals of the two halves of the tube 62 through resistors 64, 65 to provide a visual indication that traffic pulse signals are being received.

The anode terminal of one half of the tube 62 is connected to one contact of a single pole double throw switch—the normal reverse switch—66, and the anode terminal of the other half of the tube 62 is connected to another contact of the switch 66. The movable arm of the switch 66 is conected to the input terminal 67 of the switching means 14.

The switch 66 permits full monitoring of either the mark pulse signals or the space pulse signals by connecting the appropriate anode of tube 62 to the input terminal 67 of the switching means 14. Normally, the switch 66 will be positioned to monitor the space pulse signal.

*Switching means*

The switching means 14 comprises two transistors interconnected to form a bistable switching network. The input terminal 67 is coupled through a capacitor 68 to the base terminal 70 of a transistor 71 which supports a collector terminal 72 and an emitter terminal 73. A source of negative potential is connected to the base terminal 70 through a resistor 74, and to the emitter terminal 73 through a resistor 75. The collector terminal 72 is connected to a ground terminal through a resistor 76. The emitter terminal 73 of transistor 71 is connected to an emitter terminal 77 of a transistor 78 which supports a collector terminal 80 and a base terminal 81. A resistor 89 is interposed between the collector terminal 72 of transistor 71 and the base terminal 81; and a resistor 83 is interposed between collector terminal 80 and a base terminal 70. A source of negative potential is connected through a resistor 82 to the base terminal 81.

The signal from the switching means 14 is fed to the gate means 16 to urge the gate means to either pass or block pulse signals generated by the oscillator means 20 and, when required, modified by the oscillator converter means 22.

*Gate means*

The gate means 16 comprises a unidirectional conductive means such as diode 97 or the like interposed between two transistors 84, 85 each operating as an emitter follower type of circuit.

Transistor 84 supports a base terminal 86, a collector terminal 90 and an emitter terminal 91, base terminal 86 connected to a ground terminal through resistors 87, 88 connected in series. The junction of the resistors 87, 88 is connected to the collector terminal 80 of transistor 78. The collector terminal 90 is connected to a ground terminal, and the emitter terminal 91 is connected to a source of negative potential through a resistor 92.

The transistor 85 supports a base terminal 93, a collector terminal 94, and an emitter terminal 95. The collector terminal 94 is connected to a ground terminal, emitter terminal 95 is connected to a source of negative potential through a resistor 96, and base terminal 93 is connected to emitter terminal 91 through a diode 97.

The pulse signals generated by the oscillator means 20 are fed to the base terminal 93 of transistor 84 and, if the gate means 16 is in condition to pass pulse signals by the switching means 14, these pulse signals will appear at the output terminal 98 of the gate means 16.

In operation, when the transistor 78 is in its conductive state the potential at the base terminal 86 and emitter terminal 91 is close to the potential of the source of negative potential (—20 volts) and the diode 97 is urged to its open state. At this instant pulse signals fed to the base terminal 93 from the oscillator means 20 will pass through the emitter follower coupled transistor 85 and appear at the output terminal 98. However, when the transistor 78 is not in its conductive state the potential present at the base terminal 86 of transistor 84 is at ground level and the pulse signals fed to the base terminal 93 from the oscillator means 20 are short circuited to ground through the diode 97 and the emitter-base terminals of transistor 84. The received pulse signals never reach the output terminal 98 of the gate means 16.

Thus, the pulse signals generated in the oscillator means 20 and fed to the gate means 16 pass through the transistor 85 to the output terminal 98 of the gate means 16 only when the transistor 78 is in its conductive state. When the transistor 78 is in its nonconductive state the pulse signals generated in the oscillator means 20 and fed to the gate means 16 are shorted to ground. They do not pass through transistor 85 and do not appear at the output terminal 98 of the gate means 16.

The pulse signals fed to and selectively passed by the gate means 16 have a repetition rate which is determined by the baud rate of the information signals received. For purposes of identification and clarity of understanding, those pulse signals which are received from the line and represent transmitted information shall hereinafter be referred to as line pulse signals; and those pulse signals which originate in the oscillator means 20 shall hereinafter be referred to as clock pulse signals.

*Oscillator means*

The clock pulse signals are generated in the oscillator means 20 and, if required, reduced in frequency by the oscillator converter means 22. The oscillator means 20 supports one or more crystals each to generate pulse signals having discrete frequencies. Illustrated in the figures are five crystals 100, 101, 102, 103 and 104 interposed between a switch 105 and the base terminal 106 of a transistor 107 which also supports a collector terminal 108 and an emitter terminal 110. The switch 105 facilitates the changing of the clock pulse signals frequency by merely changing crystals. The base terminal 106 is coupled to a source of negative potential through a resistor 111, and to a ground terminal through a resistor 112. The emitter terminal 110 is connected to a ground terminal through a resistor 113 in shunt with a capacitor 109. The collector terminal 108 is connected to the source of negative potential through a resistor 114 and also is connected through a resistor 115 to the base terminal 116 of a transistor 117 which supports a collector terminal 118 and an emitter terminal 120. The emitter terminal 120 is connected through a capacitor 121 to the movable arm contact of the switch 105, and it is also connected to a ground terminal through a resistor 122.

A transistor 123 supports a base terminal 124, a collector terminal 125, and an emitter terminal 126. A capacitor 127 is interposed between the emitter terminal 120 of transistor 117 and base terminal 124; and a source of negative potential is connected to base terminal 124 through a resistor 128. Emitter terminal 126 is connected directly to the source of negative potential; and the collector terminal 125 is connected to a source of negative potential through two resistors 130, 131 connected in series. A ground terminal is connected to the collector terminal 125 through a resistor 132.

The junction of the resistors 130, 131 is connected to a contact terminal 133 of a baud rate switch 134. The movable contact of the switch 134 is connected through a resistor 135 to the base terminal 136 of a transistor 137 which also supports a collector terminal 138 and an emitter terminal 139. The collector terminal 138 is connected to a ground terminal and the emitter terminal 139 is connected through a resistor 140 to a source of negative potential. The signal that appears on the emitter terminal 139 is fed through a resistor 149 to the base terminal 93 of transistor 85 in the gate means 16.

The collector terminal 125 of transistor 123 is connected to the signal input terminal 141 of the oscillator converter means 22 to feed clock pulse signals which have a repetition rate that is too high to the oscillator convertor means 22 for conversion to the desired repetition rate.

*Oscillator convertor means*

The oscillator convertor means 22 supports four sections 142, 143, 144, and 145 each similar in design, construction and operation. Each section reduces the repetition rate of the signals received by it to one-half. The output signal from the first section 142 is fed to the input terminal of the second section 143; the output signal of the second section 143 is fed to the input terminal of the third section 144; and the output signal of the third section 144 is fed to the input terminal of the fourth section 145. In this manner the repetition rate of the initially generated clock pulse signals are reduced to one-half by the first section; to one-fourth by the second section; to one-eighth by the third section; and to one-sixteenth by the fourth section.

With reference to the first section 142, the input terminal 141 is connected through a capacitor 146 in series with a resistor 147 to the base terminal 148 of a transistor 150 which supports a collector terminal 151 and an emitter terminal 152.

The emitter terminal 152 is connected through a resistor 153 to a source of negative potential, and also directly to the emitter terminal 154 of a transistor 155 which supports a collector terminal 156 and a base terminal 157. The collector terminal 151 is connected through a resistor 158 to a ground terminal, through a resistor 160 in shunt with a capacitor 161 to the base terminal 157, and directly to the twelve hundred baud rate stationary contact 162 of switch 134. The junction of the capacitor 146 with the resistor 147 is connected through a resistor 163 to a source of negative potential, and is also connected through a resistor 164 to the base terminal 157 of transistor 155. The collector terminal 156 of transistor 155 is connected to the base terminal 148 of transistor 150 through a resistor 165 in shunt with a capacitor 166; and it is also connected to a ground terminal through a resistor 169.

The signal that appears on the collector terminal 156 of transistor 155 is fed to the input terminal 189 of the second section 143 of the oscillator converter means 22.

The second, third and fourth sections 143, 144, 145 of the oscillator converter means 22 are similar to the first section 142 which has just been described in detail. Therefore, to avoid repetition, reference should be made to the detailed description of the first section 142 for a detailed description of the second, third and fourth sections 143, 144, 145.

The oscillator means 20 supports an oscillator section which comprises the two transistors 107 and 117, and a desired one of the crystals 100, 101, 102, 103, or 104 connected in the feedback path. The transistor 123, which operates as an amplifier, is alternately driven to its cut-off and saturation states by the signals from the oscillator section to generate a square wave signal for driving the dual mode counter means 18. In this invention, when the line pulse signals are being received at the 2400-baud rate, the crystal 100 coupled to the oscillator section should have a frequency of 153.6 kc.

The oscillator converter means 22 supports four divider sections. Each section contains two transistors and reduces the frequency of the received signals to one-half. Thus, the oscillator converter means 22 provides signals which are submultiples of the generated pulse signals and, in the instant illustration, provides clock pulse signals for the measurements of signals having baud rates of 1200, 600, 300, and 150. All clock pulse signals, regardless of their repetition rates, are fed through the transistor 137 which operates as an emitter follower to minimize loss of the wave front slope.

The clock pulse signals passed by the gate means 16 are fed to and activate the dual mode counter means 18.

*Dual mode counter means*

The output terminal 98 of the gate means 16 is coupled to the input terminal 167 of the dual mode counter means 18. Input terminal 167 is connected through a capacitor 168 to the base terminal 170 of transistor 171 which supports a collecter terminal 172 and an emitter terminal 173. Input terminal 167 is also connected through another capacitor 174 to the base terminal 175 of transistor 176 which supports a collector terminal 177 and an emitter terminal 178. The emitter 173 is connected directly to emitter terminal 178 and to a source of negative potential through a resistor 180. Base terminal 170 is connected to base terminal 175 through resistor 181 in series with resistor 182. The junction of resistor 181 with a resistor 182 is connected through a resistor 183 to a source of negative potential. A resistor 184 in shunt with a capacitor 185 is interposed between the base terminal 170 of transistor 171 and the collector terminal 177 of transistor 176. A resistor 186 in shunt with a capacitor 187 is interposed between the base terminal 175 of transistor 176 and the collector terminal 172 of transistor 171. The collector terminal 172 is connected through a resistor 188 to a ground terminal; and collector terminal 177 is connected through a resistor 190 to a ground terminal. The junction of the resistors 180, 183 is coupled through a resistor 191 to an output terminal 192.

The dual mode counter means 18 supports seven stages 193, 194, 195, 196, 197, 198, and 200. The stage 193 is similar, in design, construction and operation to the next appearing stage 194 and, therefore, to avoid undue repetition, a detailed description of stage 194 is not here presented. However, for a detailed description of stage 194 reference should be made to the detailed description of stage 193 immediately preceding.

With reference now to stage 195—the third stage of the dual mode counter means 18—the input terminal 201 is coupled to receive signals from the second stage 194, and is connected through a capacitor 202 to the base terminal 203 of a transistor 204 which supports a collector terminal 205 and an emitter terminal 206. The terminal 201 is also connected through a capacitor 207 to the base terminal 208 of a transistor 209 which supports a collector terminal 210 and an emitter terminal 211. A source of negative potential is connected through a resistor 212 to the base terminal 203 of transistor 204, and through a resistor 213 to the base terminal 208 of transistor 209. Emitter terminal 206 is connected to emitter terminal 211 and to the source of negative potential through a resistor 214. Collector terminal 210 is connected to base terminal 203 through a resistor 215 in shunt with a capacitor 216, and it is also connected to a ground terminal through a resistor 217. Collector terminal 205 is connected to base terminal 208 through a resistor 218 in shunt with a capacitor 220, and to a ground terminal through a resistor 221. The output terminal 222 of stage 195 is coupled through a resistor 223 in series with the resistor 213 to the base terminal 208 of transistor 209.

Stages 196 and 197 are similar in design, construction and operation to the stage 195 described in detail immediately preceding. Therefore, to avoid repetition of description, a detailed description of the construction of stages 196 and 197 will not here appear and, if such a detailed description is desired reference should be made to the description of the construction of stage 195 immediately preceding this paragraph.

Stage 198 of the dual mode counter means 18 is a latching means. It is a bistable network which remains in one state until it receives an activating signal whereupon it assumes a second state. Once having assumed its second state it will not revert back to its first state until the dual mode counter means 18 is driven to its initial or zero condition. The signal initially fed to the latching means drives it from its first state to its second state which it maintains. All subsequent signals fed to the latching means are passed through for utilization by the next succeeding stage 200.

The input terminal 224 of the stage 198 is fed by the output terminal of stage 197 and is connected through a capacitor 225 in series with a capacitor 226 to the base terminal 227 of a transistor 228 which supports a collector terminal 229 and an emitter terminal 230. The base terminal 227 is connected through a resistor 231 in series with a resistor 232 to the base terminal 233 of a transistor 234 which supports a collector terminal 235 and an emitter terminal 236. The base terminal 227 is connected through a resistor 238 to the collector terminal 235 of transistor 234. The junction of resistor 231 with resistor 232 is connected through a resistor 240 to a source of negative potential. Emitter terminal 230 is connected to emitter terminal 236 and through a resistor 241 to a source of negative potential. The junction of the capacitor 225 with the capacitor 226 is connected through a resistor 242 in shunt with a diode 243 to the source of negative potential.

The collector terminal 235 is connected through a resistor 237 to the collector terminal 244 of a transistor 245 which supports an emitter terminal 246 and a base terminal 247. The collector terminal 244 is connected to collector terminal 248 of a transistor 250 which supports an emitter terminal 251 and a base terminal 252. Base terminal 247 is connected through a resistor 253 to collector terminal 229, and collector terminal 229 is connected through a resistor 254 to base terminal 233 of transistor 234. Collector terminal 248 is connected through resistor 255 to collector terminal 229. The base terminal 252 is connected through a resistor 256 to the input terminal 224. The emitter terminal 246 of transistor 245 is connected through a diode 257 to the emitter terminal 251, and emitter terminal 251 is connected to output terminal 258 and through a resistor 260 to the source of negative potential. Another output terminal 261 of stage 198 is connected through a resistor 219 in series with a capacitor 259 to the base terminal 233 of transistor 234.

The output terminals of stage 198 are coupled to the input terminals of stage 200. Terminal 261 is coupled to terminal 262, and terminal 258 is coupled to terminal 263. Terminal 263 is connected through a capacitor 264 to the base terminal 265 of a transistor 266 which supports a collector terminal 267 and an emitter terminal 268. Input terminal 263 is also connected through capacitor 272 to the base terminal 273 of transistor 274 which supports an emitter terminal 275 and a collector terminal 276. Input terminal 262 is connected through resistor 270 in series with capacitor 271 to base terminal 265 of transistor 266. Emitter terminal 268 is connected to emitter terminal 275 and to a source of negative potential through a resistor 277. Base terminal 265 is connected to base terminal 273 through a resistor 278 in series with the resistor 280. The junction of the resistor 278 with the resistor 280 is connected through a resistor 281 to a source of negative potential. The collector terminal 267 of transistor 266 is connected through a resistor 282 in shunt with a capacitor 283 to the base terminal 273 of transistor 274. The collector terminal 276 of transistor 274 is connected through a resistor 284 in shunt with a capacitor 285 to the base terminal 265 of transistor 266. A ground terminal is connected through a resistor 286 to the collector terminal 276 of transistor 274, and also through the resistor 287 to the collector terminal 267 of transistor 266.

The first two stages 193, 194 of the dual mode counter means vary slightly from the succeeding stages in design only—they do not vary in operation. This difference is dictated by the requirement that the first two stages count (or divide) accurately the high speed clock pulse signals that are received. The repetition rate of the clock pulse signals fed by the second stage 194 to the next occurring stage 195 is reduced considerably from those fed to the first stage 193 and, therefore, the operating requirements of the stages following stage 194 are not so critical and a more economically constructed stage network can be used.

The dual mode counter means 18 supports six counter (or divider) stages 193, 194, 195, 196, 197 and 200, and a latching means 198 which is a bistable switching means commonly referred to as a "flip-flop." The structure of this invention is adjusted such that for each signal bit length sixty four clock pulse signals will be generated and fed to the input terminal 167 of the dual mode counter means 18.

Upon the receipt of the thirty second clock pulse signal by the dual mode counter means 18 the stage 197 (the fifth stage) drives the latching means stage 198 to its "on" state thereby coupling stage 200 to stage 197. The activation of stage 198 indicates the occurrence of the first half of the received signal bit or line pulse signal. After the activation of the stage 198, the first five stages 193, 194, 195, 196 and 197 again count received clock pulse signals until a second group of thirty-two clock pulse signals (a total of sixty four) have been counted. At this instant the stage 197 feeds a pulse signal through stage 198—which was driven to its "on" state and remains latched in that state—to stage 200 which now assumes its active state.

Now, after the activation of the stage 200, the first five stages 193, 194, 195, 196 and 197 again resume the count of the received clock pulse signals until a third group of thirty-two clock pulse signals (a total of ninety-six) have been counted. At this instant the stage 197 feeds a pulse signal through stage 198 which is still latched in its "on" state to stage 200 which now assumes its inactive or "off" state. Thus, after the occurrence of the ninety-sixth clock pulse signal the dual mode counter means 18 is in the same state that it assumed after the occurrence of the thirty-second clock pulse signal.

The cycling of the dual mode counter means 18 now continues in the manner indicated in the immediately preceding paragraphs—the stage 198 being latched in its "on" state and stage 200 being driven alternately to its "on" state and its "off" state with each group of thirty-two clock pulse signals until the termination of the line pulse signal.

Repeating, at the occurrence of the first group of thirty-two clock pulse signals (a time duration equal to one-half a bit length) only the stage 198 assumes its "on" state. At the occurrence of the second group of thirty-two clock pulse signals (a time duration equal to a bit length) both the stage 198 and the stage 200 assumes its "on" state. At the occurrence of the third group of thirty-two clock pulse signals (a time duration equal to one and a half bit lengths) only the stage 198 assumes its "on" state. This cycling procedure continues until the line pulse signal being examined terminates.

Continuing, if at the termination of the occurrence of the line pulse signal only the stage 198 is in its "on" state then the length of the measured line pulse signal is exactly one-half, or one and one-half, or two and one-half, and so on, bit lengths. However, if the stage 198 and a combination of the stages 193, 194, 195, 196, and 197 are in their "on" state, then the received line pulse signal contains marking bias—the amount of marking bias being indicated by the count present in the stages 193–197.

In a like manner, if, at the termination of the occurrence of the line pulse signal both of the stages 198, and 200 are in their "on" state then the length of the measured line pulse signal is exactly one bit length, or some multiple of it. However, if the stages 198 and 200 and a combination of the stages 193, 194, 195, 196 and 197 are in their "on" state, then the received line pulse signal contains spacing bias—the amount of spacing bias being indicated by the count present in the stages 193–197.

Thus, this invention can measure multiple unit pulse signals as well as single unit line pulse signals.

The dual mode counter means 18 is activated by the positive to negative transitions of the signal at the collector terminal 80 of transistor 78. This signal is actually the inverted mark to space transition of the line pulse signal when the normal reverse switch 66 is in its normal position. The space to mark transition generates a negative to positive transition at the collector terminal 80 of transistor 78 to terminate the count.

The count present in the dual mode counter means 18 is then fed through a transfer means 24 to a storage means 26. A readout means 29 interprets the information in the storage means and feeds it to the bias meter where it is displayed visually. The display is maintained until the next line pulse signal has been examined and is ready for display.

*Transfer network*

With reference to stage 193, the collector terminal 177 of transistor 176 is connected through a resistor 290 to the base terminal 291 of a transistor 292 which supports a collector terminal 293 and an emitter terminal 294. Emitter terminal 294 is connected through a resistor 295 to the output terminal 192, and through a resistor 296 to the emitter terminal 297 of a transistor 298 which supports a collector terminal 300 and a base terminal 301. The base terminal 301 is connected through a resistor 302 to a ground terminal. The collector terminal 293 is connected to a ground terminal.

The transfer means of stages 194, 195 and 196 are similar in design, construction and operation to the transfer means of stage 193 described, in detail, in the preceding paragraph. Therefore, to avoid the repetitious recitation of the various parts of the transfer means, those sections associated with stages 194, 195 and 196 will not here be described in detail and, if a detailed description of the transfer means section of stage 194, 195 or 196 is desired, reference should be made of the detailed description of the transfer means section of stage 193 which appears in the paragraph preceding.

The transfer means section of stages 197 and 200 are similar in design, construction, and operation to the transfer means section of stage 193 except for the omission of the resistor 295 present in stage 193.

With reference to the transfer means section of stage 198, the emitter terminal 246 of transistor 245 is connected through a resistor 303 to the emitter terminal 304 of a transistor 305 which supports a collector terminal 306 and a base terminal 307. The base terminal 307 is connected through a resistor 308 to the collector terminal 248 of transistor 250. A source of negative potential is connected through a resistor 310 to the emitter terminal 246 of transistor 245.

The transfer means 24 couples the stages of the dual mode counter means 18 to the storage means 26. With particular reference to the transfer means section of stage 193 the transistor 298 is normally back biased to provide an open circuit. Now, after a count has been completed a negative pulse signal from the transfer pulse generator 49 is fed to the base terminal 301 of the transistor 298 to close the circuit momentarily thereby enabling the storage means section of stage 193 to assume the state of the stage 193 of the dual mode counter means 18. Immediately after stage 193 of the storage means 26 has assumed the state of the stage 193 of the dual mode counter means, the pulse signal from the transfer pulse generator terminates to open the circuit and the stage 193 of the storage means 26 is isolated from the stage 193 of the dual mode counter means. The transistor 292 is operated as an isolating emitter follower type of circuit.

The operation of each of the other stages of the transfer means 24 is similar to the operation of stage 193 described in the paragraph immediately preceding.

*Transfer pulse generator*

With reference to the transfer pulse generator 49, a source of negative potential is connected through a resistor 311 to the base terminal 312 of a transistor 313 which supports an emitter terminal 314 and a collector terminal 315. The base terminal 312 is connected through a resistor 316 to the collector terminal 317 of a transistor 318 which supports a base terminal 320 and an emitter terminal 321. A ground terminal is connected through a resistor 322 to the collector terminal 315 and through a resistor 323 to the collector terminal 317. Collector terminal 315 is connected through a capacitor 324 to the base terminal 320. Emitter terminal 314 is connected to emitter terminal 321 and through a resistor 325 to a source of negative potential. Base terminal 320 is connected through a resistor 326 to a source of negative potential and through a capacitor 327 in series with a resistor 328 to the collector terminal 80 of transistor 78. The collector terminal 317 of transistor 318 is connected through a capacitor 328 in series with a resistor 330 to a source of negative potential. The collector terminal 317 is also connected through a resistor 331 to an output terminal 332. The output terminal 332 is connected to feed a pulse signal to the base terminal of the normally back biased transistor of each stage of the transfer means 24. With reference to stage 193, the output terminal 332 is connected through a resistor 333 to the base terminal 301 of transistor 298.

The transfer pulse generator 49 supports a monostable network commonly referred to as a "single shot multivibrator" which comprises the transistors 313 and 318. The monostable network is driven by the negative to positive transition signal at the collector terminal 80 of transistor 78, and its time duration is just long enough to provide the energy required to urge the transistors of the transfer means to their saturation states.

*Reset pulse generator*

With reference to the reset pulse generator 59, the terminal common to the capacitor 328 and the resistor 330 of the transfer pulse generator is connected through a capacitor 334 to the base terminal 335 of a transistor 336 which supports a collector terminal 337 and an emitter terminal 338. The base terminal 335 is connected through a capacitor 340 to the collector terminal 341 of a transistor 342 which supports a base terminal 343 and an emitter terminal 344. Emitter terminal 338 is connected to emitter terminal 344 and through a resistor 345 to a source of negative potential. Base terminal 335 is connected through a resistor 346 to a source of negative potential, base terminal 343 is connected through a resistor 347 to a source of negative potential, and collector terminal 337 is connected to base terminal 343 through a resistor 348, and to a source of negative potential through a capacitor 350 in series with a resistor 351 in shunt with a diode 352. Collector terminal 341 is connected through a resistor 353 to a ground terminal, and collector terminal 337 is connected through a resistor 354 to a ground terminal. The junction of the capacitor 350 with the parallel combination of the resistor 351, diode 352 is connected to the output terminal 355.

The signal that appears at the output terminal 355 is fed to each stage of the dual mode counter means to reset the dual mode counter means 18 to its zero or initial condition.

With reference to stage 193, which is similar to stages 194, 195, 196, and 197, the output terminal 355 is connected through a resistor 356 in series with a capacitor 357 to the base terminal 170 of transistor 171.

With reference to the stages 198, 200, the output terminal 355 is connected to the terminals 261–262.

The return of the transfer pulse generator to its normal stage activates the monostable or "single shot" multivibrator which comprises the transistors 336, 342 in the reset pulse generator 59 to generate a reset pulse signal. This generated reset pulse signal is fed to and resets to zero each stage 191 through 200 of the dual mode counter means 18. At this instant the dual mode counter means 18 is ready to resume the count examination of a next occurring pulse signal.

*Storage means*

Referring, now, to the storage means, stage 193, the collector terminal 293 of transistor 292 is connected through a resistor 358 to the base terminal 360 of a transistor 361 which supports a collector terminal 362 and an emitter terminal 363. The collector terminal 300 of transistor 298 is connected through a resistor 364 to the base terminal 365 of a transistor 366 which supports a collector terminal 367 and an emitter terminal 368. Base terminal 360 is connected through a resistor 370 to the collector terminal 367. Collector 362 is connected through a resistor 371 to the base terminal 365. Emitter terminal 363 is connected to emitter terminal 368 and through resistor 372 to the collector terminal 293 of transistor 292. Base terminal 365 is connected through resistor 373 to collector terminal 293. Collector terminal 362 is connected through a resistor 374 to a source of negative potential, and collector terminal 367 is connected through a resistor 379 to a source of negative potential.

Each of the other stages 194, 195, 196, 197, 198, and 200 of the storage means 26 is similar in design and construction to the stage 193 described in detail in the paragraph preceding. Therefore, for a detailed description of the stages 194, 195, 196, 197, 198, or 200 of the storage means 26 reference should be made to the detailed description of stage 193 of the storage means 26.

The storage means 26 supports seven stages, one stage for each stage of the dual mode counter means 18. Each stage of the storage means assumes and holds the "count" of its associated stage of the dual mode counter means.

The storage means drives the readout means.

*Readout means*

With reference to the readout means 29, stage 193, a source of negative potential is connected through a resistor 275 to the emitter terminal 376 of a transistor 377 which supports a collector terminal 378 and a base terminal 380. Base terminal 380 is connected through a resistor 381 to the collector terminal 362 of transistor 361. Emitter terminal 376 is connected through a fixed resistor 382 in series with a potentiometer 383 to a ground terminal.

Each of the stages 194, 195, 196, 197, 198 and 200 of the readout means 29 is similar in design and construction to the stage 193 of the readout means described in detail in the preceding paragraph. Therefore, for a detailed description of any one or of all of the stages 194, 195, 196, 197, 198 or 200 of the readout means reference should be made to the detailed description of stage 193 of the readout means 29 as appears in the paragraph preceding.

The readout means 29 examines the pulse length count as displayed in the storage means 26 and feeds a signal having a magnitude of one hundred microamperes per integer of count into the signal arm of a bridge type of network. The magnitude of the current for stage 193 is determined by the value of the weighing resistor 275. The total current from the stage of the readout means 29 is fed to the meter means 69 which indicates the bias distortion and distortion other than bias.

*Meter means*

The input terminal 383 of the meter means 69 is connected through an inductor 384 in series with an adjustable resistor 385 to a terminal of zero center microampere meter 386. The meter has a maximum range of one hundred microamperes and its scale extends from one hundred microamperes through zero to one hundred microamperes (100–0–100). The input terminal 383 is also connected through a resistor 387 to a source of negative potential, and through a resistor 388 to the grid terminal 390 of a vacuum tube 391 which supports another grid terminal 392, two anode terminals 393, 394 and two cathode terminals 395, 396.

The other terminal of the meter 386 is connected through a resistor 397 to a source of negative potential and to the collector terminal 398 of a transistor 400 which supports an emitter terminal 401 and a base terminal 402. Emitter terminal 401 is connected through a fixed resistor 403 in series with a variable resistor 404 to a ground terminal 405. Collector terminal 398 is connected through a resistor 406 to the base terminal 402.

Referring now to the vacuum tube 391, the cathode terminal 395 is connected through a resistor 407 to a source of negative potential, and grid terminal 392 is connected through resistor 408 to a source of negative potential and through a resistor 410 to the anode terminal 393. The anode terminal 393 is connected through a resistor 411 to a source of positive potential, and anode terminal 394 is connected through a resistor 412 to a source of positive potential. The cathode terminal 396 is connected through a resistor 413 to a ground terminal and through a resistor 414 to a source of positive potential.

The anode terminal 394 is connected through a capacitor 415 in series with a diode 416 to the grid terminal 417 of a vacuum tube 418 which supports an anode terminal 420 and a cathode terminal 421. The vacuum tube 418 also supports a second triode section composed of anode terminal 422, grid terminal 423 and cathode terminal 424. The anode terminal 420 is connected to anode terminal 422 through a resistor 425 which supports a tap terminal 426. The tap terminal 426 is connected to a source of positive potential.

The anode terminal 394 is also connected through a resistor 427 to the grid terminal 423. A resistor 428 is connected in shunt with the capacitor 415, and a capacitor 430 is interposed between grid terminal 417 and grid terminal 423. Grid terminal 423 is connected to ground through a capacitor 431. Cathode terminal 421 is connected through a resistor 432 to a ground terminal and cathode terminal 424 is connected through a resistor 433 to a ground terminal. One terminal of an ampere meter 434 which has a range of zero to two hundred microamperes is connected to cathode terminal 421. The other terminal of the meter 434 is connected through a variable resistor 435 to the cathode terminal 424.

In operation, the collector current from the transistor of the readout means 29 is fed through the resistor 387. This resistor is a precision one hundred ohm resistor. The current from the collector of the transistor 400 is used as a reference current and is fed to a second resistor 397 which is also a precision one hundred ohm resistor. The zero center meter 386 is connected between the bridge arms and its reading is proportional to the difference in currents. When the pulse signal being measured is the correct length as indicated by the presence of a count of either thirty two or sixty four then the readout current will equal the reference current and the meter 386 will indicate zero.

The inductor 384 attenuates the transient signals which may occur, and the variable resistor 385 limits the current fed to the meter 386.

The voltage present across the resistor 387 is fed through the resistor 388 to the grid terminal 390 of vacuum tube 391. The anode terminal 393 which, in combination with grid terminal 390 and cathode terminal 395 forms a triode, is D.C. coupled to the grid terminal 392. The grid terminal 392 together with the anode terminal 394 and cathode terminal 396 form a triode type of vacuum tube which is connected to operate as a cathode follower. The output signal of the cathode follower section is fed to an integrating network and is also fed to a peak detector network. The capacitor 415 and a high quality diode 416 cooperate to form the peak detector. The signal from the peak detector is fed to the capacitor 430. The voltage across the capacitor 430 is fed to the grid terminal 417 of the triode section of tube 418 consisting of anode terminal 420, grid terminal 417 and cathode terminal 421. The integrated signal which appears across the capacitor 431 is fed to the grid terminal 423 of the other triode section of tube 418 consisting of anode terminal 422, grid terminal 423, and cathode terminal 424.

The distortion (other than bias) meter 434 is connected between the cathode terminals 421, 424, and indicates the differential between the average pulse length (bias) and the shortest pulse length in a wavetrain that is the deviation from the average in one direction only.

The power supply 440 is used with the structure of this invention as the source of negative potentials and the source of positive potentials. This power supply is transistorized and was found to operate in a satisfactory manner.

Obviously many modifications and variations of the present invention are possible in the light of the above teachings. It is therefore to be understood that within the scope of the appended claims the invention may be practiced otherwise than as specifically described.

What is claimed is:

1. An indicating device comprising an oscillator means to generate clock pulse signals, switching means coupled to receive line pulse signals, gate means urged selectively by said switching means to pass clock pulse signals during the occurrence of a line pulse signal to be measured, dual mode counter means fed by said gate means to count clock pulse signals passed by said gate means, storage means to hold the count present in said dual mode counter means, transfer means interposed between said storage means and said dual mode counter means, transfer pulse generator means fed by said switching means coupled to urge said transfer means to feed the information in the dual mode counter means to the storage means, readout means fed by said storage means to transform the information present in said storage means to an analog potential, meter means fed by said readout means to indicate distortion present in the line pulse signal measured, and reset pulse generator means fed by said transfer pulse generator means coupled to urge said dual mode counter means to its zero state.

2. An indicating device comprising an oscillator means to generate clock pulse signals, switching means coupled to receive line pulse signals, gate means urged selectively by said switching means to pass clock pulse signals during the occurrence of a line pulse signal to be measured, dual mode counter means fed by said gate means to count clock pulse signals passed by said gate means, storage means to hold the information present in said dual mode counter means, transfer means interposed between said storage means and said dual mode counter means, transfer pulse generator means fed by said switching means coupled to urge said transfer means to feed the information in the dual mode counter means to the storage means, readout means fed by said storage means to transform the information in said storage means to an analog potential, a first meter fed by said readout means to indicate bias distortion present in the line pulse signal measured, a second meter fed by said readout means to indicate distortion other than bias present in the line pulse signal measured, and reset pulse generator means fed by said transfer pulse generator means coupled to urge said dual mode counter means to its zero state.

3. An indicating device comprising an oscillator means to generate clock pulse signals, switching means coupled to receive line pulse signals, gate means urged selectively by said switching means to pass clock pulse signals during the occurrence of a line pulse signal to be measured, a pulse signal counter fed by said gate means to count clock pulse signals passed by said gate means, latching means coupled to said pulse signal counter to indicate the occurrence of a predetermined count, storage means to hold the information present in said pulse signal counter and said latching means, transfer means interposed between said storage means and said pulse signal counter and said latching means, transfer pulse generator means fed by said switching means coupled to urge said transfer means to feed the information in the pulse signal counter and the latching means to the storage means, readout means fed by said storage means to transform the information in said storage means to an analog potential, a first meter fed by said readout means to indicate bias distortion present in the line pulse signal measured, a second meter fed by said readout means to indicate distortion other than bias present in the line pulse signal measured, and reset pulse generator means fed by said transfer pulse generator means coupled to urge said pulse signal counter and said latching means to their zero state.

4. An indicating device comprising an oscillator means to generate clock pulse signals, switching means coupled to receive line pulse signals, gate means urged selectively by said switching means to pass clock pulse signals during the occurrence of a line pulse signal to be measured, a six stage pulse signal counter fed by said gate means to count clock pulse signals passed by said gate means, a bistable network coupled to indicate the occurrence of a predetermined count in said six stage pulse signal counter, storage means to hold the information present in said six stage pulse signal counter and said bistable network, transfer means interposed between said storage means and said six stage pulse signal counter and said bistable network, transfer pulse generator means fed by said switching means coupled to urge said transfer means to feed the information in the six stage pulse signal counter and the bistable network to the storage means, readout means fed by said storage means to transform the information present in said storage means to an analog potential, a first meter fed by said readout means to indicate bias distortion present in the line pulse signal measured, a second meter fed by said readout means to indicate distortion other than bias present in the line pulse signal measured, and reset pulse generator means fed by said transfer pulse generator means coupled to urge said six stage pulse signal counter and said bistable network to their zero states.

References Cited by the Examiner

UNITED STATES PATENTS

| | | | |
|---|---|---|---|
| 2,652,197 | 9/53 | Berger | 235—92 |
| 2,803,405 | 8/57 | Howell | 235—92 |
| 2,851,596 | 9/58 | Hilton | 235—92 |
| 3,063,631 | 11/62 | Ray | 235—92 |

FOREIGN PATENTS

| | | |
|---|---|---|
| 735,942 | 8/55 | Great Britain. |

MALCOLM A. MORRISON, *Primary Examiner.*